United States Patent
Blanke

(10) Patent No.: US 9,455,979 B2
(45) Date of Patent: Sep. 27, 2016

(54) SYSTEM AND METHOD FOR ESTABLISHING TRUST USING SECURE TRANSMISSION PROTOCOLS

(71) Applicant: NOK NOK LABS, INC., Palo Alto, CA (US)

(72) Inventor: William J. Blanke, White Salmon, WA (US)

(73) Assignee: NOK NOK LABS, INC., Palo Alto, CA (US)

(*) Notice: Subject to any disclaimer, the term of this patent is extended or adjusted under 35 U.S.C. 154(b) by 0 days.

(21) Appl. No.: 14/448,697

(22) Filed: Jul. 31, 2014

(65) Prior Publication Data

US 2016/0219043 A1 Jul. 28, 2016

(51) Int. Cl.
H04L 29/06 (2006.01)
H04L 9/00 (2006.01)

(52) U.S. Cl.
CPC .......... *H04L 63/0823* (2013.01); *H04L 9/006* (2013.01)

(58) Field of Classification Search
CPC ... G06F 21/33; G06F 21/31; H04L 63/0863; H04L 63/12
USPC ........................................ 713/171, 170, 175
See application file for complete search history.

(56) References Cited

U.S. PATENT DOCUMENTS 6,618,806 B1 9/2003 Brown et al.
6,751,733 B1 6/2004 Nakamura et al.
(Continued)

FOREIGN PATENT DOCUMENTS

WO WO2013/082190 6/2013

OTHER PUBLICATIONS

Dawei Zhang; Peng Hu;, "Trusted e-commerce user agent based on USB Key", Proceedings of the International MultiConference of Engineers and Computer Scientists 2008 vol. I, IMECS 2008, Mar. 19-21, 2008, Hong Kong.*
(Continued)

*Primary Examiner* — Syed Zaidi
(74) *Attorney, Agent, or Firm* — Nicholson De Vos Webster & Elliott LLP

(57) ABSTRACT

A system, apparatus, method, and machine readable medium are described for establishing trust using secure communication protocols. For example, one embodiment of a method comprises: generating a first authentication-related communication at an authentication server on behalf of a relying party the first authentication-related communication being directed to a client device having one or more authenticators; signing the first authentication-related communication using a first key of a self-signed certificate from a decentralized public key infrastructure (PKI); establishing a first secure communication channel with a relying party app on the client device using a trusted secure communication infrastructure; transmitting the first authentication-related communication with the signature to the relying party app over the first secure communication channel; establishing a second secure communication channel with an authentication client on the client device using a trusted secure communication infrastructure; transmitting a second key of the self-signed certificate from the decentralized PKI to the authentication client over the second communication channel; providing the first authentication-related communication from the relying party app to the authentication client; and the authentication client using the second key to validate the signature generated over the first authentication-related communication with the first key.

24 Claims, 9 Drawing Sheets

(56) References Cited

U.S. PATENT DOCUMENTS

| | | |
|---|---|---|
| 6,938,156 B2 | 8/2005 | Wheeler et al. |
| 7,487,357 B2 | 2/2009 | Smith |
| 7,512,567 B2 | 3/2009 | Bemmel et al. |
| 7,698,565 B1 | 4/2010 | Bjorn et al. |
| 7,865,937 B1 | 1/2011 | White |
| 8,060,922 B2 | 11/2011 | Crichton |
| 8,166,531 B2 | 4/2012 | Suzuki |
| 8,245,030 B2 | 8/2012 | Lin |
| 8,353,016 B1 | 1/2013 | Pravetz et al. |
| 8,584,224 B1 | 11/2013 | Pei et al. |
| 8,646,060 B1 | 2/2014 | Ben Ayed |
| 8,713,325 B2 | 4/2014 | Ganesan |
| 8,719,905 B2 | 5/2014 | Ganesan |
| 8,776,180 B2 | 7/2014 | Kumar et al. |
| 8,856,541 B1 | 10/2014 | Chaudhury et al. |
| 8,949,978 B1 | 2/2015 | Lin |
| 8,958,599 B1 | 2/2015 | Starner |
| 8,978,117 B2 | 3/2015 | Bentley et al. |
| 9,032,485 B2 | 5/2015 | Chu |
| 2002/0073316 A1 | 6/2002 | Collins et al. |
| 2002/0174344 A1 | 11/2002 | Ting |
| 2003/0055792 A1 | 3/2003 | Kinoshita |
| 2003/0065805 A1 | 4/2003 | Barnes |
| 2003/0087629 A1 | 5/2003 | Juitt |
| 2003/0135740 A1 | 7/2003 | Talmor et al. |
| 2003/0226036 A1 | 12/2003 | Bivens et al. |
| 2004/0101170 A1 | 5/2004 | Tisse |
| 2004/0123153 A1 | 6/2004 | Wright et al. |
| 2005/0160052 A1 | 7/2005 | Schneider |
| 2005/0223236 A1 | 10/2005 | Yamada et al. |
| 2005/0278253 A1 | 12/2005 | Meek et al. |
| 2006/0029062 A1 | 2/2006 | Rao |
| 2006/0282670 A1* | 12/2006 | Karchov .............. H04L 63/0823 713/175 |
| 2007/0005988 A1 | 1/2007 | Zhang et al. |
| 2007/0088950 A1 | 4/2007 | Wheeler |
| 2007/0107048 A1 | 5/2007 | Halls et al. |
| 2007/0165625 A1* | 7/2007 | Eisner .................... G06F 9/546 370/389 |
| 2007/0168677 A1 | 7/2007 | Kudo |
| 2007/0169182 A1* | 7/2007 | Wolfond ................. G06F 21/31 726/7 |
| 2007/0278291 A1 | 12/2007 | Rans et al. |
| 2008/0005562 A1 | 1/2008 | Sather et al. |
| 2008/0025234 A1 | 1/2008 | Zhu |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0086759 A1 | 4/2008 | Colson |
| 2008/0134311 A1 | 6/2008 | Medvinsky |
| 2008/0172725 A1 | 7/2008 | Fujii et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0313719 A1 | 12/2008 | Kaliski, Jr. et al. |
| 2008/0320308 A1 | 12/2008 | Kostiainen et al. |
| 2009/0064292 A1 | 3/2009 | Carter et al. |
| 2009/0089870 A1 | 4/2009 | Wahl |
| 2009/0100269 A1 | 4/2009 | Naccache |
| 2009/0116651 A1 | 5/2009 | Liang |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1 | 6/2009 | Chan |
| 2009/0183003 A1 | 7/2009 | Haverinen |
| 2009/0204964 A1 | 8/2009 | Foley |
| 2009/0235339 A1 | 9/2009 | Mennes et al. |
| 2009/0307139 A1 | 12/2009 | Mardikar et al. |
| 2009/0328197 A1 | 12/2009 | Newell |
| 2010/0029300 A1 | 2/2010 | Chen |
| 2010/0042848 A1 | 2/2010 | Rosener |
| 2010/0070424 A1 | 3/2010 | Monk |
| 2010/0082484 A1 | 4/2010 | Erhart et al. |
| 2010/0105427 A1 | 4/2010 | Gupta |
| 2010/0169650 A1 | 7/2010 | Brickell et al. |
| 2010/0175116 A1 | 7/2010 | Gum |
| 2010/0186072 A1 | 7/2010 | Kumar |
| 2010/0223663 A1 | 9/2010 | Morimoto et al. |
| 2010/0242088 A1 | 9/2010 | Thomas |
| 2010/0325664 A1 | 12/2010 | Kang |
| 2010/0325684 A1 | 12/2010 | Grebenik |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0078443 A1 | 3/2011 | Greenstein et al. |
| 2011/0082801 A1* | 4/2011 | Baghdasaryan ....... G06Q 20/10 705/75 |
| 2011/0083016 A1 | 4/2011 | Kesanupalli et al. |
| 2011/0107087 A1 | 5/2011 | Lee et al. |
| 2011/0167154 A1 | 7/2011 | Bush et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0246766 A1 | 10/2011 | Orsini et al. |
| 2011/0265159 A1 | 10/2011 | Ronda |
| 2011/0279228 A1 | 11/2011 | Kumar |
| 2011/0280402 A1 | 11/2011 | Ibrahim et al. |
| 2011/0296518 A1 | 12/2011 | Faynberg et al. |
| 2011/0307949 A1 | 12/2011 | Ronda |
| 2011/0314549 A1 | 12/2011 | Song et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0084566 A1 | 4/2012 | Chin et al. |
| 2012/0102553 A1 | 4/2012 | Hsueh et al. |
| 2012/0124651 A1 | 5/2012 | Ganesan |
| 2012/0159577 A1 | 6/2012 | Belinkiy |
| 2012/0191979 A1 | 7/2012 | Feldbau |
| 2012/0204032 A1* | 8/2012 | Wilkins ................. H04L 9/006 713/170 |
| 2012/0272056 A1 | 10/2012 | Ganesan |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati |
| 2013/0061055 A1 | 3/2013 | Schibuk |
| 2013/0073859 A1 | 3/2013 | Carlson et al. |
| 2013/0090939 A1 | 4/2013 | Robinson |
| 2013/0097682 A1 | 4/2013 | Zeljkovic |
| 2013/0104190 A1 | 4/2013 | Simske |
| 2013/0119130 A1 | 5/2013 | Braams |
| 2013/0124285 A1 | 5/2013 | Pravetz et al. |
| 2013/0125197 A1 | 5/2013 | Pravetz |
| 2013/0125222 A1 | 5/2013 | Pravetz et al. |
| 2013/0133049 A1 | 5/2013 | Peirce |
| 2013/0144785 A1 | 6/2013 | Karpenko |
| 2013/0159413 A1 | 6/2013 | Davis et al. |
| 2013/0159716 A1 | 6/2013 | Buck et al. |
| 2013/0337777 A1 | 12/2013 | Deutsch et al. |
| 2014/0007215 A1 | 1/2014 | Romano |
| 2014/0013422 A1 | 1/2014 | Janus et al. |
| 2014/0040987 A1 | 2/2014 | Haugsnes |
| 2014/0044265 A1 | 2/2014 | Kocher et al. |
| 2014/0066015 A1 | 3/2014 | Aissi |
| 2014/0068746 A1 | 3/2014 | Gonzalez |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan |
| 2014/0189360 A1 | 7/2014 | Baghdasaryan |
| 2014/0189779 A1 | 7/2014 | Baghdasaryan |
| 2014/0189791 A1 | 7/2014 | Lindemann |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan |

(56) References Cited

U.S. PATENT DOCUMENTS

| | | |
|---|---|---|
| 2014/0201809 A1 | 7/2014 | Choyi et al. |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289833 A1 | 9/2014 | Briceno et al. |
| 2014/0298419 A1 | 10/2014 | Boubez |
| 2015/0180869 A1 | 6/2015 | Verma |
| 2015/0269050 A1 | 9/2015 | Filimonov |
| 2015/0326529 A1 | 11/2015 | Morita |
| 2015/0381580 A1 | 12/2015 | Graham et al. |

OTHER PUBLICATIONS

Vassilev, A.T.; du Castel, B.; Ali, A.M.; , "Personal Brokerage of Web Service Access," Security & Privacy, IEEE , vol. 5, No. 5, pp. 24-31, Sep.-Oct. 2007.*

T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.*

Anthony J. Nicholson, "Mobile Device Security Using Transient Authentication," IEEE Transactions on Mobile Computing vol. 5, No. 11, pp. 1489-1502 (Nov. 2006).

Mohammad O. Derawi, "Unobtrusive User-Authentication on Mobile Phones using Biometric Gait Recognition" (2010), 6 pages.

Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf), 11 pages.

BehavioSec, "Measuring FAR/FRR/EER in Continuous Authentication," Stockholm, Sweden (2009), 8 pages.

The Online Certificate Status Protocol (OCSP, RFC2560), 22 pages, Jun. 1999.

See current WikiPedia article for "Eye Tracking" at en.wikipedia.org/wiki/Eye_tracking, 15 pages, 2014.

(See Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website), 3 pages.

Notification of Transmittal of the International Search Report and the Written Opinion from counterpart Patent Cooperation Treaty Application No. PCT/US13/77888, mailed Aug. 8, 2014, 10 pages.

Notification of Transmittal of the International Search Report and the Written Opinion from counterpart Patent Cooperation Treaty Application No. PCT/US14/39627, mailed Oct. 16, 2014, 3 pages.

Notification of Transmittal of the International Search Report and the Written Opinion from counterpart Patent Cooperation Treaty Application No. PCT/US14/31344, mailed Nov. 3, 2014, 8 pages.

Office Action from U.S. Appl. No. 14/066,384, mailed Jan. 7, 2015, 24 pages.

Office Action from U.S. Appl. No. 14/145,439, mailed Feb. 12, 2015, 18 pages.

Office Action from U.S. Appl. No. 14/145,533, mailed Jan. 26, 2015, 13 pages.

Office Action from U.S. Appl. No. 14/145,607, mailed Mar. 20, 2015, 22 pages.

Office Action from U.S. Appl. No. 14/218,551, mailed Apr. 23, 2015, 9 pages.

Office Action from U.S. Appl. No. 14/218,575, mailed Feb. 10, 2015, 17 pages.

Office Action from U.S. Appl. No. 14/066,273, mailed May 8, 2015, 31 pages.

Notice of Allowance from U.S. Appl. No. 14/145,533, mailed May 11, 2015, 5 pages.

Notice of Allowance from U.S. Appl. No. 14/145,439, mailed Jul. 6, 2015, 6 pages.

Office Action from U.S. Appl. No. 14/268,733, mailed Jul. 16, 2015, 13 pages.

Notification of Transmittal of the International Search Report and the Written Opinion from counterpart Patent Cooperation Treaty Application No. PCT/US2015/028924, mailed Jul. 30, 2014, 10 pages.

Office Action from U.S. Appl. No. 14/218,575, mailed Aug. 7, 2015, 19 pages.

Final Office Action from U.S. Appl. No. 14/066,384, mailed Aug. 20, 2015, 23 pages.

Office Action from U.S. Appl. No. 14/268,619, mailed Aug. 24, 2015, 17 pages.

Notice of Allowance from U.S. Appl. No. 14/145,607, mailed Sep. 2, 2015, 19 pages.

Final Office Action from U.S. Appl. No. 14/218,551, mailed Sep. 9, 2015, 15 pages.

Notice of Allowance from U.S. Appl. No. 14/145,533, mailed Sep. 14, 2015, 13 pages.

Notification of Transmittal of the International Search Report and the Written Opinion from counterpart Patent Cooperation Treaty Application No. PCT/US2015/042785, mailed Oct. 16, 2015, 8 pages.

Notification of Transmittal of the International Search Report and the Written Opinion from counterpart Patent Cooperation Treaty Application No. PCT/US2015/042799, mailed Oct. 19, 2015, 13 pages.

Office Action from U.S. Appl. No. 14/448,641, mailed Nov. 9, 2015, 21 pages.

Barker et al; "Recommendation for key management Part 3: Application-Specific Key Management Guidance"; NIST special Publication 800-57, pp. 1-103, Dec. 2009.

Office Action from U.S. Appl. No. 14/448,814, mailed Aug. 4, 2015, 13 pages.

World Wide Web Consortium, W3C Working Draft: Media Capture and Streams (2013).

Office Action from U.S. Appl. No. 14/218,692, mailed Nov. 4, 2015, 16 pages.

Notice of Allowance from U.S. Appl. No. 14/145,439, mailed Oct. 28, 2015, 12 pages.

Brickell, Ernie, Jan Camenisch, and Liqun Chen. "Direct anonymous attestation." *Proceedings of the 11th ACM conference on Computer and communications security*. ACM, 2004, 6 pages.

Chen, Liqun, and Jiangtao Li. "Flexible and scalable digital signatures in TPM 2.0." *Proceedings of the 2013 ACM SIGSAC conference on Computer & communications security*. ACM, 2013.

Chakka, Murali Mohan, et al. "Competition on counter measures to 2-d facial spoofing attacks." *Biometrics (IJCB), 2011 International Joint Conference on*. IEEE, 2011, 6 pages.

Marcialis, Gian Luca, et al. "First international fingerprint liveness detection competition—livdet 2009." *Image Analysis and Processing—ICIAP 2009*. Springer Berlin Heidelberg, 2009. 12-23.

Uludag, Umut, and Anil K. Jain. "Attacks on biometric systems: a case study in fingerprints." *Electronic Imaging 2004*. International Society for Optics and Photonics, 2004, 12 pages.

Ratha, Nalini K., Jonathan H. Connell, and Ruud M. Bolle. "An analysis of minutiae matching strength." *Audio-and Video-Based Biometric Person Authentication*. Springer Berlin Heidelberg, 2001, 7 pages.

Schneier, B., "Biometrics: Uses and Abuses". Aug. 1999. Inside Risks 110 (CACM 42, Aug. 8, 1999). http://www.schneier.com/essay-019.pdf.

Zhao, W., et al. "Face Recognition: A Literature Survey". ACM Computing Surveys, vol. 35, No. 4. Dec. 2003, pp. 399-458.

Abate, A., et al., "2D and 3D face recognition: A survey". Pattern Recognition Letters. 2007, 28, pp. 1885-1906.

GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.

Wilson, R., James. Unbuntu Life, "How To Trick Google's New Face Unlock On Android 4.1 Jelly Bean". Print Screen Mac.

(56) References Cited

OTHER PUBLICATIONS

[Online] Aug. 6, 2012. [Cited: Sep. 28, 2012.] http://printscreenmac.info/how-to-trick-android-jelly-bean-face-unlock/. downloaded Aug. 13, 2015.
Phillips, P., J., et al., "Face Recognition Vendor Test 2002: Evaluation Report". s.l.: NISTIR 6965, 2002. 56 pages. http://www.face-rec.org/vendors/FRVT_2002_Evaluation_Report.pdf.
Phillips, P.J., et al., "FRVT 2006 and ICE 2006 Large-Scale Results", NIST IR 7408. Gaithersburg: NIST, 2006. Mar. 29, 2007. pp. 1-55.
Grother, P.J., et al., NIST. Report on the Evaluation of 2D Still-Image Face Recognition Algorithms, NIST IR 7709. s.l.: NIST, 2011. Jun. 22, 2010. pp. 1-58.
Roberts, C., "Biometric Attack Vectors and Defences". Sep. 2006. 25 pages. http://otago.ourarchive.ac.nz/bitstream/handle/10523/1243/BiometricAttackVectors.pdf.
Pinto, A., et al., "Video-Based Face Spoofing Detection through Visual Rhythm Analysis". Los Alamitos: IEEE Computer Society Conference Publishing Services, 2012. Conference on Graphics, Patterns and Images, 25. 8 pages.(SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
Li, J., et al., "Live Face Detection Based on the Analysis of Fourier Spectra". Biometric Technology for Human Identification. 2004, pp. 296-303.
Tan, X., et al., "Face Liveness Detection from A Single Image with Sparse Low Rank Bilinear Discriminative Model". s.l.: European Conference on Computer Vision, 2010. pp. 1-14.
Määttä, J., et al., "Machine Vision Group, University of Oulu", Finland. "Face Spoofing Detection From Single Images Using Micro-Texture Analysis". Oulu, Finland: IEEE, 2011. pp 1-7. http://www.ee.oulu.fi/research/mvmp/mvg/files/pdf/131.pdf.
Heikkila, M., et al., "A Texture-Based Method for Modeling the Background and Detecting Moving Objects". Oulu: IEEE, Jun. 22, 2005. Draft. 16 pages. http://www.ee.oulu.fi/mvg/files/pdf/pdf_662.pdf.
Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.
Kong, S., et al., "Recent advances in visual and infrared face recognition" —a review. Journal of Computer Vision and Image Understanding. Jun. 2005, vol. 1, 97, pp. 103-135.
Kollreider, K., et al., Halmstad University, SE-30118, Sweden. Evaluating Liveness by Face Images and the Structure Tensor. Halmstad, Sweden: s.n., 2005. http://citeseerx.ist.psu.edu/viewdoc/download?doi=10.1.1.62.6534&rep=rep1&type=pdf.
Smiatacz, M., et al., Gdansk University of Technology. Liveness Measurements Using Optical Flow for Biometric Person Authentication. Metrology and Measurement Systems. 2012, vol. XIX, 2. pp. 257-268.
Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.
Pan, G., et al., "Liveness Detection for Face Recognition". Recent Advances in Face Recognition. Vienna: I-Tech, 2008, Ch. 9, pp. 109-124, ISBN: 978-953-7619-34-3.
National Science & Technology Council's Subcommittee on Biometrics. Biometrics Glossary. 33 pages, Last updated Sep. 14, 2006. NSTC. http://www.biometrics.gov/documents/glossary.pdf.
Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview_EUSIPCO04.pdf.
Rodrigues, R.N., et al. Robustness of multimodal biometric fusion methods against spoof attacks. Journal of Visual Language and Computing. 2009. 11 pages, doi:10.1016/j.jvlc.2009.01.010; http://cubs.buffalo.edu/govind/papers/visual09.pdf.
Akhtar, Z., et al., "Spoof Attacks on Multimodal Biometric Systems". Alfarid. Singapore: IACSIT Press, Singapore, 2011. 2011 International Conference on Information and Network Technology IPCSIT. vol. 4. pp. 46-51. http://www.ipcsit.com/vol4/9-ICINT2011T046.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Lubin, G., et al., Business Insider. "16 Heatmaps That Reveal Exactly Where People Look". [Online] May 21, 2012. [Cited: Nov. 1, 2012.] pp. 1-21. http://www.businessinsider.com/eye-tracking-heatmaps-2012-5?op=1.
Huang, L., et al., "Clickjacking: Attacks and Defenses". s.l.: Usenix Security 2012, pp. 1-16, 2012. https://www.usenix.org/system/files/conference/usenixsecurity12/sec12-final39.pdf.
Willis, N., Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.
Chetty, G. School of ISE, University of Canberra, Australia. "Multilevel liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.
Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PervComp2012_draft.pdf.
Jafri, R., et al., "A Survey of Face Recognition Techniques. Journal of Information Processing Systems", vol. 5, No. 2, Jun. 2009. Jun. 2009, vol. 5, 2, pp. 41-68. http://www.cosy.sbg.ac.at/~uhl/face_recognition.pdf.
Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.
Phillips, P. J., et al., "Biometric Image Processing and Recognition". Chellappa. 1998. Eusipco .8 pages.
Zhou, et al., "Face Recognition from Still Images and Videos". University of Maryland, College Park, MD 20742. Maryland: s.n., Nov. 5, 2004. pp. 1-23, http://citeseerx.ist.psu.edu/viewdoc/download?doi=10.1.1.77.1312&rep=rep1&type=pdf.
Quinn, G.W., et al., NIST. "Performance of Face Recognition Algorithms on Compressed Images", NIST Inter Agency Report 7830. s.l.: NIST, Dec. 4, 2011.
The Extended M2VTS Database. [Online] [Cited: Sep. 29, 2012.] downloaded Jan. 28, 2015, 1 page; http://www.ee.surrey.ac.uk/CCSSP/xm2vtsdb/.
Ratha, N. K., et al., IBM. "Enhancing security and privacy in biometrics-based authentication systems". IBM Systems Journal. 2001, vol. 40, 3. pp. 614-634.
Schuckers, S., Schuckers SAC. "Spoofing and Anti-Spoofing Measures". Information Security Technical Report. Dec. 10, 2002, vol. 7, 4., pp. 56-62.
Schwartz, W., et al., "Face Spoofing Detection through Partial Least Squares and Low-Level Descriptors". s.l.: Intl. Joint Conference on Biometrics 2011. pp. 1-8.
Edited by Kresimir Delac, Mislav Grgic and Marian Stewart Bartlett. s.l.: InTech, Jun. 1, 2008. http://cdn.intechopen.com/finals/81/InTech-Recent_advances_in_face_recognition.zip. ISBN 978-953-7619-34-3. Uploaded as Chapters 1-15.
Pan, G., et al., "Monocular camera-based face liveness detection by combining eyeblink and scene context" pp. 215-225. s.l.: Springer

(56) References Cited

OTHER PUBLICATIONS

Science+Business Media, LLC, Aug. 4, 2010. http://www.cs.zju.edu.cn/~gpan/publication/2011-TeleSys-liveness.pdf.
Tronci, R, et al., "Fusion of multiple clues for photo-attack detection in face recognition systems". 09010 Pula (CA), Italy: s.n., 2011. pp. 1-6. http://prag.diee.unica.it/pra/system/files/Amilab_IJCB2011.pdf.
Rocha, A., et al., "Vision of the Unseen: Current Trends and Challenges in Digital Image and Video Forensics". s.l.: ACM Computing Surveys, 2010. http://www.wjscheirer.com/papers/wjs_csur2011_forensics.pdf.
Linux.com, The source for Linux information. 2012. 3 pages, downloaded Jan. 28, 2015.
Kollreider, K., et al., "Non-instrusive liveness detection by face images". Image Vis. Comput. (2007). doi:10.1016/j.imavis.2007.05.004, Received Feb. 18, 2006, received in revised form, Jan. 24, 2007 and accepted May 22, 2007. 12 pages.
Notification of Transmittal of the International Search Report and the Written Opinion from counterpart Patent Cooperation Treaty Application No. PCT/US2015/42827, mailed Oct. 30, 2015, 9 pages.
Transmittal of International Preliminary Report on Patentability from foreign counterpart PCT/US2013/077888, mailed Jul. 9, 2015, 7 pages.
Notification of Transmittal of the International Search Report and the Written Opinion from counterpart Patent Cooperation Treaty Application No. PCT/US2015/042870, mailed Oct. 30, 2015, 9 pages.
Validity, OSTP Framework, 24 pages, 2010.
Notice of Allowance from U.S. Appl. No. 14/268,686, mailed Nov. 5, 2015, 23 pages.
Notification of Transmittal of the International Search Report and the Written Opinion from counterpart Patent Cooperation Treaty Application No. PCT/US15/50348, mailed Dec. 22, 2015, 9 pages.
Office Action from U.S. Appl. No. 14/448,868, mailed Dec. 3, 2015, 15 pages.
Office Action from U.S. Appl. No. 14/487,992, mailed Dec. 31, 2015, 12 pages.
Final Office Action from U.S. Appl. No. 14/268,619, mailed Dec. 14, 2015, 10 pages.
Notification of Transmittal of International Search Report and Written Opinion from PCT/US2015/028927, mailed Jul. 30, 2015, 12 pages.
Transmittal of International Preliminary Report on Patentability from foreign counterpart PCT Patent Application No. PCT/US2014/039627 mailed Dec. 10, 2015, 8 pages.
Final Office Action from U.S. Appl. No. 14/268,733, mailed Jan. 15, 2016, 14 pages.
Notice of Allowance from U.S. Appl. No. 14/145,533, mailed Jan. 20, 2016, 12 pages.
Office Action from U.S. Appl. No. 14/218,743, mailed Jan. 21, 2016, 12 pages.
Office Action from U.S. Appl. No. 14/218,551, mailed Jan. 21, 2016, 11 pages.
Office Action from U.S. Appl. No. 14/218,575, mailed Jan. 29, 2016, 25 pages.
Transmittal of International Preliminary Report On Patentability from foreign counterpart PCT Patent Application No. PCT/US2014/031344 mailed Oct. 1, 2015, 9 pages.
Notice of Allowance from U.S. Appl. No. 14/145,607, mailed Feb. 1, 2016, 28 pages.
Final Office Action from U.S. Appl. No. 14/448,814, mailed Feb. 16, 2016, 14 pages.
Final Office Action from U.S. Appl. No. 14/066,273, mailed Feb. 11, 2016, 29 pages.
Final Office Action from U.S. Appl. No. 14/218,692, mailed Mar. 2, 2016, 24 pages.
Final Office Action from U.S. Appl. No. 14/218,646, mailed Mar. 10, 2016, 23 pages.
Notice of Allowance from U.S. Appl. No. 14/145,439, mailed Mar. 14, 2016, 17 pages.
Notice of Allowance from U.S. Appl. No. 14/066,384, mailed Mar. 17, 2016, 40 pages.
Office Action from U.S. Appl. No. 14/268,619, mailed Mar. 21, 2016, 7 pages.
Notice of Allowance from U.S. Appl. No. 14/268,686, mailed Mar. 30, 2016, 38 pages.
Office Action from U.S. Appl. No. 14/448,814, mailed Jun. 14, 2016, 17 pages.
Office Action from U.S. Appl. No. 14/066,273, mailed Jun. 16, 2016, 43 pages.
Notice of Allowance from U.S. Appl. No. 14/448,641, mailed Jun. 7, 2016, 13 pages.
Office Action from U.S. Appl. No. 14/218,611, mailed Jun. 16, 2016, 13 pages.
Office Action from U.S. Appl. No. 14/218,677, mailed Aug. 2, 2016, 15 pages.
Final Office Action from U.S. Appl. No. 14/218,646, mailed Aug. 11, 2016, 25 pages.
Final Office Action from U.S. Appl. No. 14/218,575, mailed Jul. 7, 2016, 29 pages.

\* cited by examiner

SYSTEM AND METHOD FOR ESTABLISHING TRUST USING SECURE TRANSMISSION PROTOCOLS

BACKGROUND

1. Field of the Invention

This invention relates generally to the field of data processing systems. More particularly, the invention relates to a system and method for establishing trust using secure transmission protocols.

2. Description of Related Art

Systems have also been designed for providing secure user authentication over a network using biometric sensors. In such systems, the a score generated by an authenticator, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US Patent Applications ("Co-pending Applications"), which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 Application").

Briefly, the Co-Pending Applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy. The '504 Application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1A:
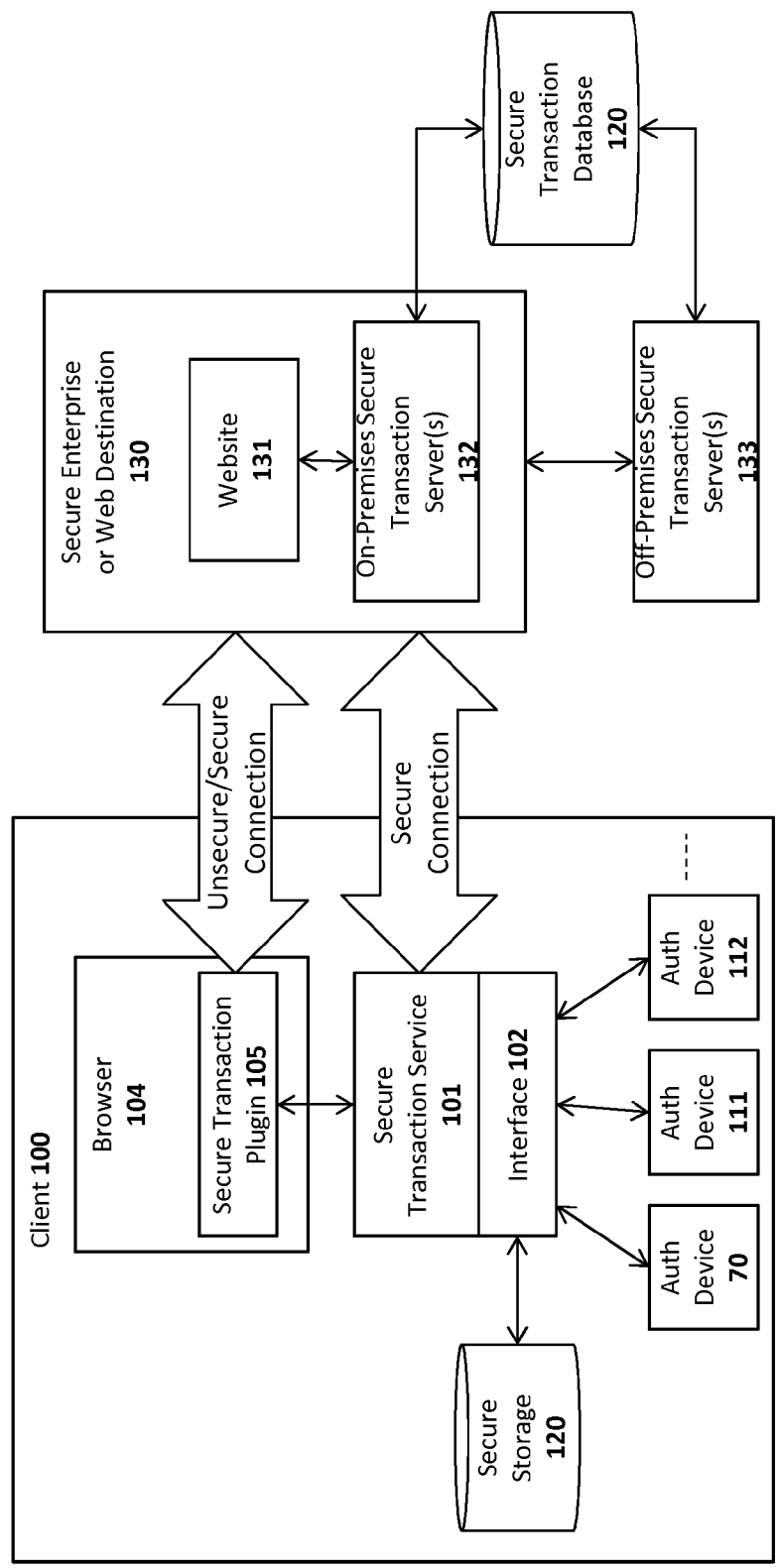
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers (sometimes referred to as "au implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary System Architectures and Transactions

Figure 1B:
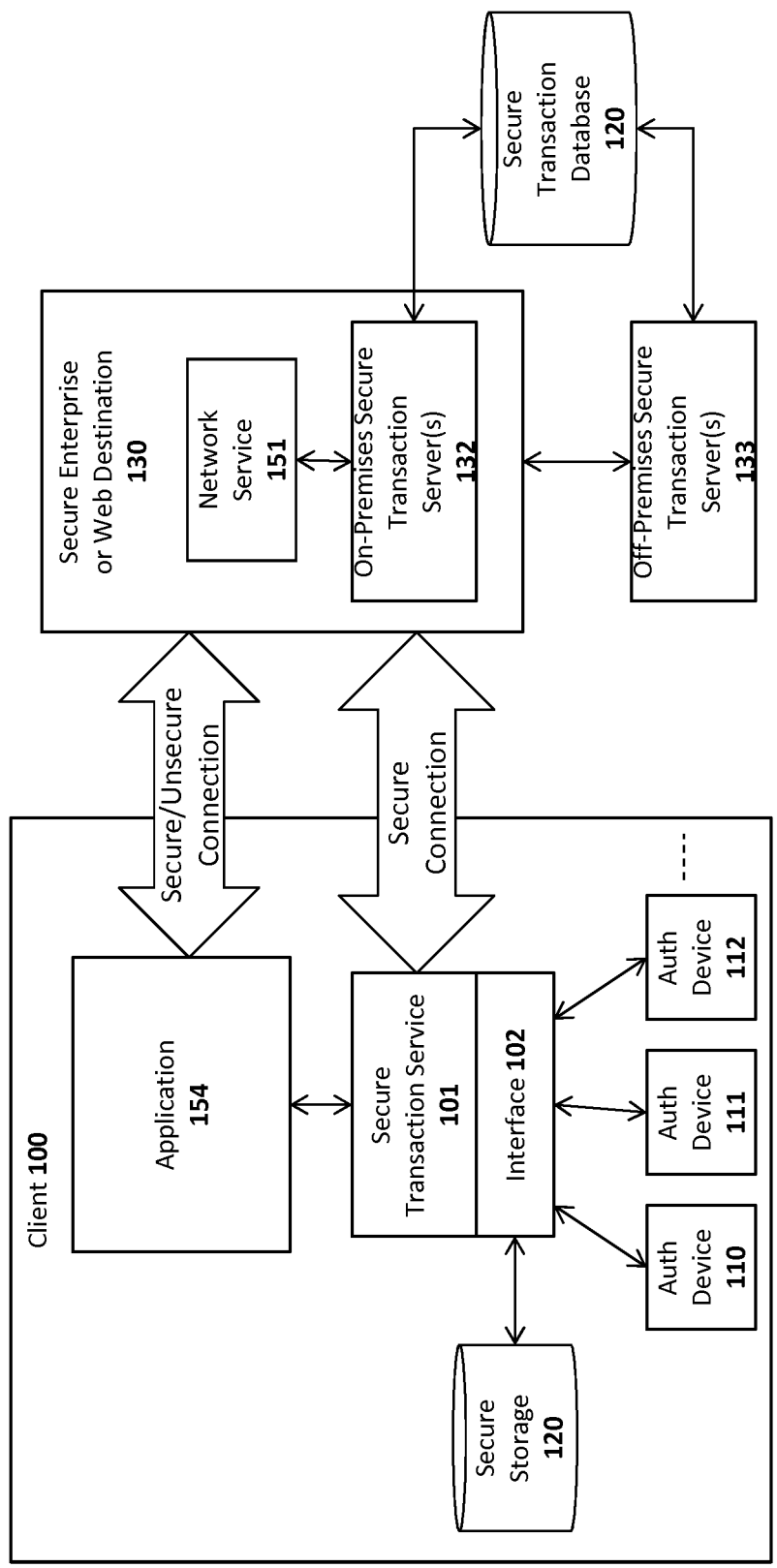

FIGS. 1A-B illustrate two embodiments of a system architecture comprising client-side and server-side components for registering authenticating devices and authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by he authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Certain basic principles associated with remotely registering authentication devices and authenticating with a relying party will be described with respect to FIGS. 2-5, followed by a detailed description of embodiments of the invention for establishing trust using secure communication protocols.

Figure 2:
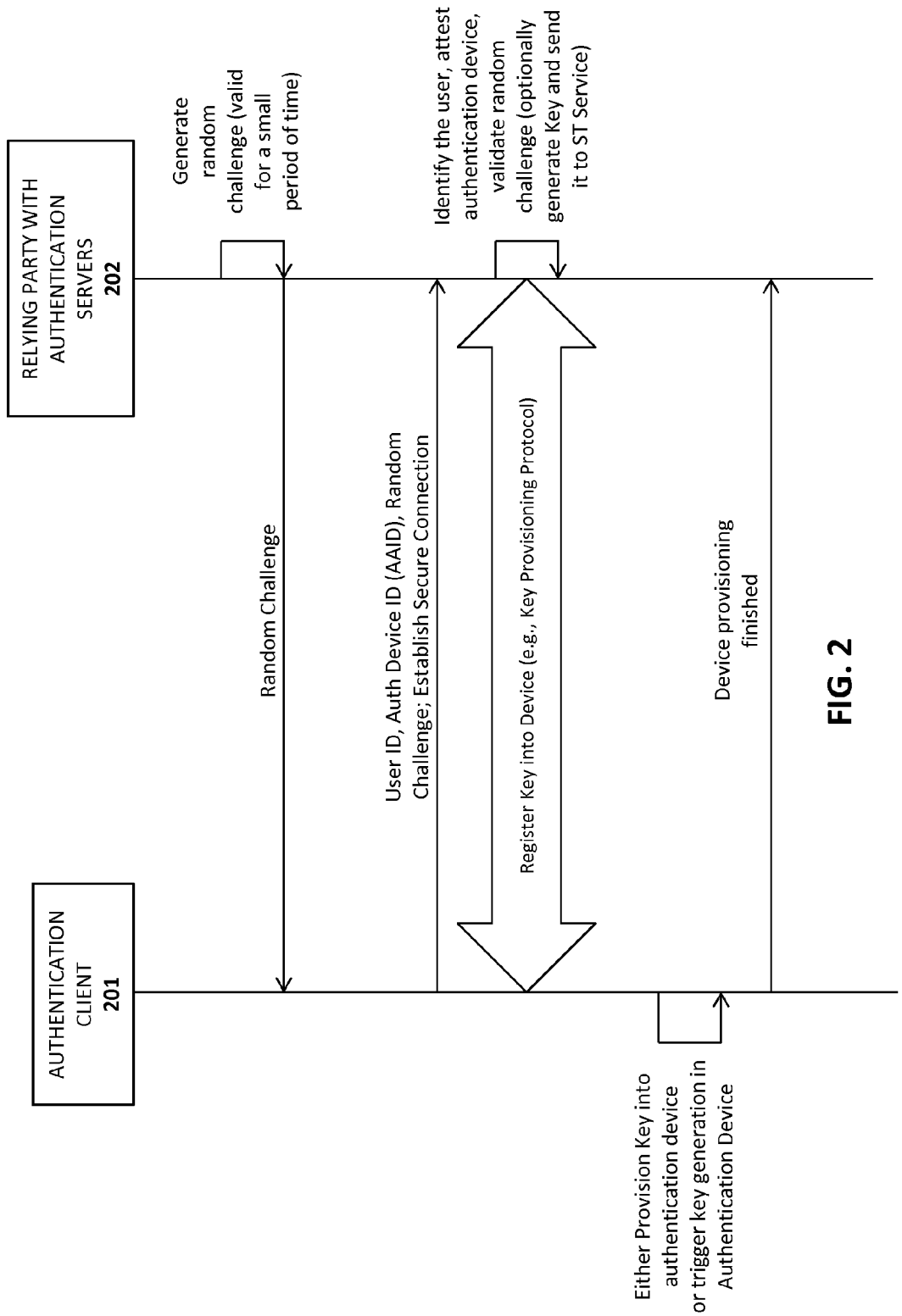
FIG. 2 is a transaction diagram showing how keys may be registered into authentication devices.

FIG. 2 illustrates a series of transactions for registering authentication devices on a client (such as devices 110-112 on client 100 in FIGS. 1A-B). For simplicity, the secure transaction service 101 and interface 102 are combined together as authentication client 201 and the secure enterprise or web destination 130 including the secure transaction servers 132-133 are represented as a relying party 202.

During registration of an authenticator (e.g., a fingerprint authenticator, voice authenticator, etc), a key associated with the authenticator is shared between the authentication client 201 and the relying party 202. Referring back to FIGS. 1A-B, the key may be stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys are be used. In this embodiment, the public/private key pair may be generated by the secure transaction servers 132-133. The public key may then be stored by the secure transaction servers 132-133 and the related private key may be stored in the secure storage 120 on the client. In an alternate embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol is employed in one embodiment to share the key with the client over a secure communication channel. One example of a key provisioning protocol is the Dynamic Symmetric Key Provisioning Protocol (DSKPP) (see, e.g., Request for Comments (RFC) 6063). However, the underlying principles of the invention are not limited to any particular key provisioning protocol. In one particular embodiment, the client generates a public/private key pair and sends the public key to the server, which may be attested with an attestation key.

Turning to the specific details shown in FIG. 2, to initiate the registration process, the relying party 202 generates a randomly generated challenge (e.g., a cryptographic nonce) that must be presented by the authentication client 201 during device registration. The random challenge may be valid for a limited period of time. In response, the authentication client 201 initiates an out-of-band secure connection with the relying party 202 (e.g., an out-of-band transaction) and communicates with the relying party 202 using the key provisioning protocol (e.g., the DSKPP protocol mentioned above). To initiate the secure connection, the authentication client 201 may provide the random challenge back to the relying party 202 (potentially with a signature generated over the random challenge). In addition, the authentication client 201 may transmit the identity of the user (e.g., a user ID or other code) and the identity of the authentication device(s) to be registered (e.g., using the authentication attestation ID (AAID) which uniquely identify the type of authentication device(s) being registered).

The relying party locates the user with the user name or ID code (e.g., in a user account database), validates the random challenge (e.g., using the signature or simply comparing the random challenge to the one that was sent), validates the authentication device's authentication code if one was sent (e.g., the AAID), and creates a new entry in a secure transaction database (e.g., database 120 in FIGS. 1A-B) for the user and the authentication device(s). In one embodiment, the relying party maintains a database of authentication devices which it accepts for authentication. It may query this database with the AAID (or other authentication device(s) code) to determine if the authentication device(s) being registered are acceptable for authentication. If so, then it will proceed with the registration process.

In one embodiment, the relying party 202 generates an authentication key for each authentication device being registered. It writes the key to the secure database and sends the key back to the authentication client 201 using the key provisioning protocol. Once complete, the authentication device and the relying party 202 share the same key if a symmetric key was used or different keys if asymmetric keys were used. For example, if asymmetric keys were used, then the relying party 202 may store the public key and provide the private key to the authentication client 201. Upon receipt of the private key from the relying party 202, the authentication client 201 provisions the key into the authentication device (storing it within secure storage associated with the authentication device). It may then use the key during authentication of the user (as described below). In an alternate embodiment, the key(s) are generated by the authentication client 201 and the key provisioning protocol is used to provide the key(s) to the relying party 202. In either case, once provisioning is complete, the authentication client 201 and relying party 202 each have a key and the authentication client 201 notifies the relying party of the completion.

Figure 3:
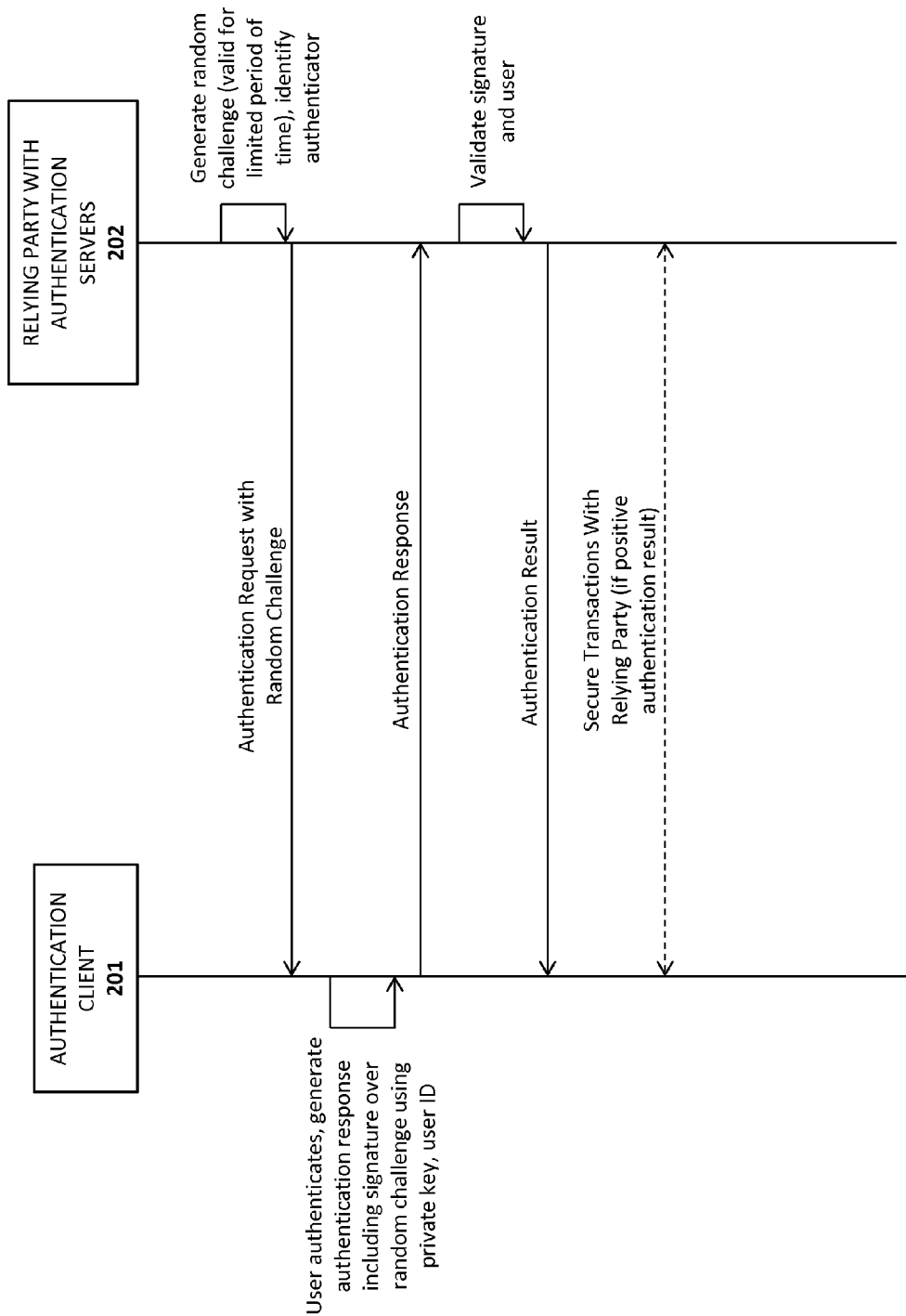
FIG. 3 illustrates a transaction diagram showing remote authentication.
Figure 4:
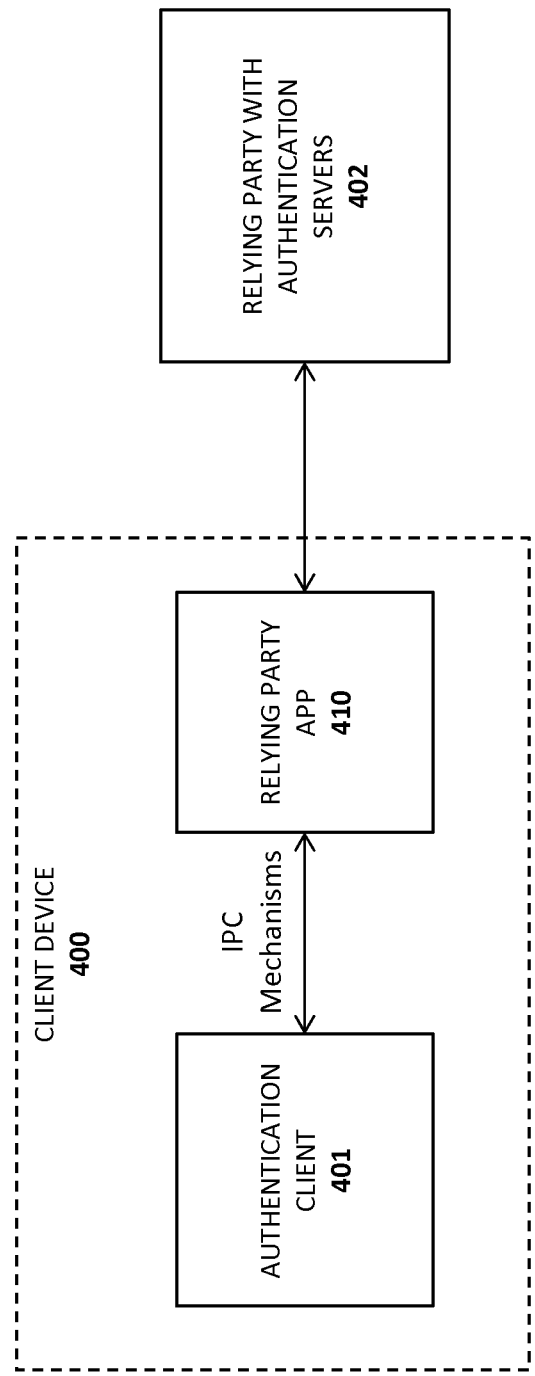
FIG. 4 illustrates how authentication with a relying party may require use of a relying party app.

FIG. 3 illustrates a series of transactions for user authentication with the registered authentication devices. Once device registration is complete (as described in FIG. 2), the relying party 201 will accept an authentication response (sometimes referred to as a "token") generated by the local authentication device on the client as a valid authentication response.

Turning to the specific details shown in FIG. 3, in response to the user initiating a transaction with the relying party 202 which requires authentication (e.g., initiating payment from the relying party's website, accessing private user account data, etc), the relying party 202 generates an authentication request which includes a random challenge (e.g., a cryptographic nonce). In one embodiment, the random challenge has a time limit associated with it (e.g., it is valid for a specified period of time). The relying party may also identify the authenticator to be used by the authentication client 201 for authentication. As mentioned above, the relying party may register each authentication device available on the client and stores a public key for each registered authenticator. Thus, it may use the public key of an authenticator or may use an authenticator ID (e.g., AAID) to identify the authenticator to be used. Alternatively, it may provide the client with a list of authentication options from which the user may select.

In response to receipt of the authentication request, the user may be presented with a graphical user interface (GUI) requesting authentication (e.g., in the form of a web page or a GUI of an authentication application/app). The user then performs the authentication (e.g., swiping a finger on a fingerprint reader, etc). In response, the authentication client 201 generates an authentication response containing a signature over the random challenge with the private key associated with the authenticator. It may also include other relevant data such as the user ID code in the authentication response.

Upon receipt of the authentication response, the relying party may validate the signature over the random challenge (e.g., using the public key associated with the authenticator) and confirm the identity of the user. Once authentication is complete, the user is permitted to enter into secure transactions with the relying party, as illustrated.

A secure communication protocol such as Transport Layer Security (TLS) or Secure Sockets Layer (SSL) may be used to establish a secure connection between the relying party 201 and the authentication client 202 for any or all of the transactions illustrated in FIGS. 2-3.

System and Method for Establishing Trust Using Secure Transmission Protocols

As mentioned above, in certain implementations using remote authentication, a secure communication protocol such as TLS or SSL may be used to securely exchange data between the relying party and the authentication client. Briefly, TLS and SSL are cryptographic protocols which provide secure communication over normally insecure communication channels (e.g., the Internet). They use X.509 certificates which implement asymmetric cryptography to exchange a symmetric key. This symmetric key is then used during a communication session to encrypt the data channel between the parties. While the remainder of this detailed description will focus on the use of TLS, the underlying principles of the invention may be implemented using other cryptographic protocols such as SSL.

In one embodiment, TLS is used to secure the communication channel between the relying party and authentication client and to validate the identity of the sender. That is, by using asymmetric cryptography supported by X.509 certificates, one party (e.g., the authentication client) has the ability to validate the identity of the counterparty (e.g., the relying party) or vice versa. The identity of the counterparty may be embodied in a code or name which, for example, identifies the relying party (e.g., "RPNAME") or identifies the authentication client or a specific application on the client used to establish the communication channel with the relying party (e.g., an "AppID"). When a direct channel exists between the authentication client and the relying party (as in the examples provided above), the use of TLS works well for this purpose since the data is typically sent over the Internet and TLS is always available.

However, on certain computing device platforms such as iOS™, Android™, and Near Field Communication (NFC) transactions, this TLS assumption doesn't hold. As illustrated generally in FIG. 4, on these platforms, third party code such as a relying party app 410 is expected to manage all communications between the relying party 402 and the authentication client 401. Thus, the relying party app 410 acts essentially like a man-in-the-middle between the relying party 402 and the authentication client 401. Moreover, the authentication client 401 has no information regarding the validity of the TLS connection established by the relying party app 410. It must simply rely on the third party code to make this determination and hand off the authentication requests using IPC mechanisms (as illustrated). These IPC mechanisms have access to the identification code of the sending app (e.g., the "bundle ID"), but verifying the authenticity of the identity of the sender/recipient (e.g., RPNAME, AppID) using the bundle ID relies heavily on the operating system and the care of the vetting process implemented by the app store that distributed the relying party app.

With NFC, the situation is even worse, because there is no identification code such as a bundle ID that accompanies the transport mechanism. NFC is handled by a generic Multipurpose Internet Mail Extensions (MIME) handler. The authentication client 401 must assume whatever identification code (e.g., RPNAME) is being claimed is correct and that the authentication request is coming from a valid source.

More specifically, on iOS devices, the app 410 that is communicating with the authentication client 401 is determined using the sourceApplication parameter of the openURL( ) call in the multifactor authentication client's AppDelegate code: —(BOOL)application:(UIApplication *)application openURL:(NSURL *)url sourceApplication:(NSString *)sourceApplication annotation:(id) annotation In this example, sourceApplication contains the bundle ID of the calling app. The bundle ID is a unique string in the calling app's plist manifest that identifies the app in Apple™ database. The bundle ID is recommended to be partly constructed using the base URL of the company in reverse notation (e.g., com.paypal.app). As such, Apple is assumed to vet this string to make sure the app does not attempt to spoof other applications.

For Android devices, getCallingUid( ) is first called from the system Binder to return the Linux uid assigned to the relying party process that sent the current transaction to the multifactor authentication process that is being processed, for example:
 int callerUId=Binder.getCallingUid( );
The app then retrieves the packages that are associated with that user ID from the system PackageManager. Packages are named using the relying party's base URL as a component but in reverse notation (e.g., "com.fido.android.sample.app.paypal"). For example:
 String packageNames[ ]=mPackageManager.getPackagesForUid(callerUId);

With NFC there is no trustable piece of information that can be mapped to a counterparty identifier (e.g., RPNAME or AppID). With NFC on Android, the request arrives via a Multipurpose Internet Mail Extensions (MIME) handler and the caller is not identifiable. Thus, any identifier included in the request may or may not be valid.

One embodiment of the invention addresses these limitations by signing the authentication request and origin identifier using a trusted certificate. The SSL X.509 certificate from the web server that can be validated against the mobile device's root certificate store is one option employed in one embodiment. However, the relying party's authentication server may not have access to that key. Generating a new X.509 certificate specifically for the authentication server is another option, but this means additional overhead to manage yet another X.509 certificate.

Figure 5:
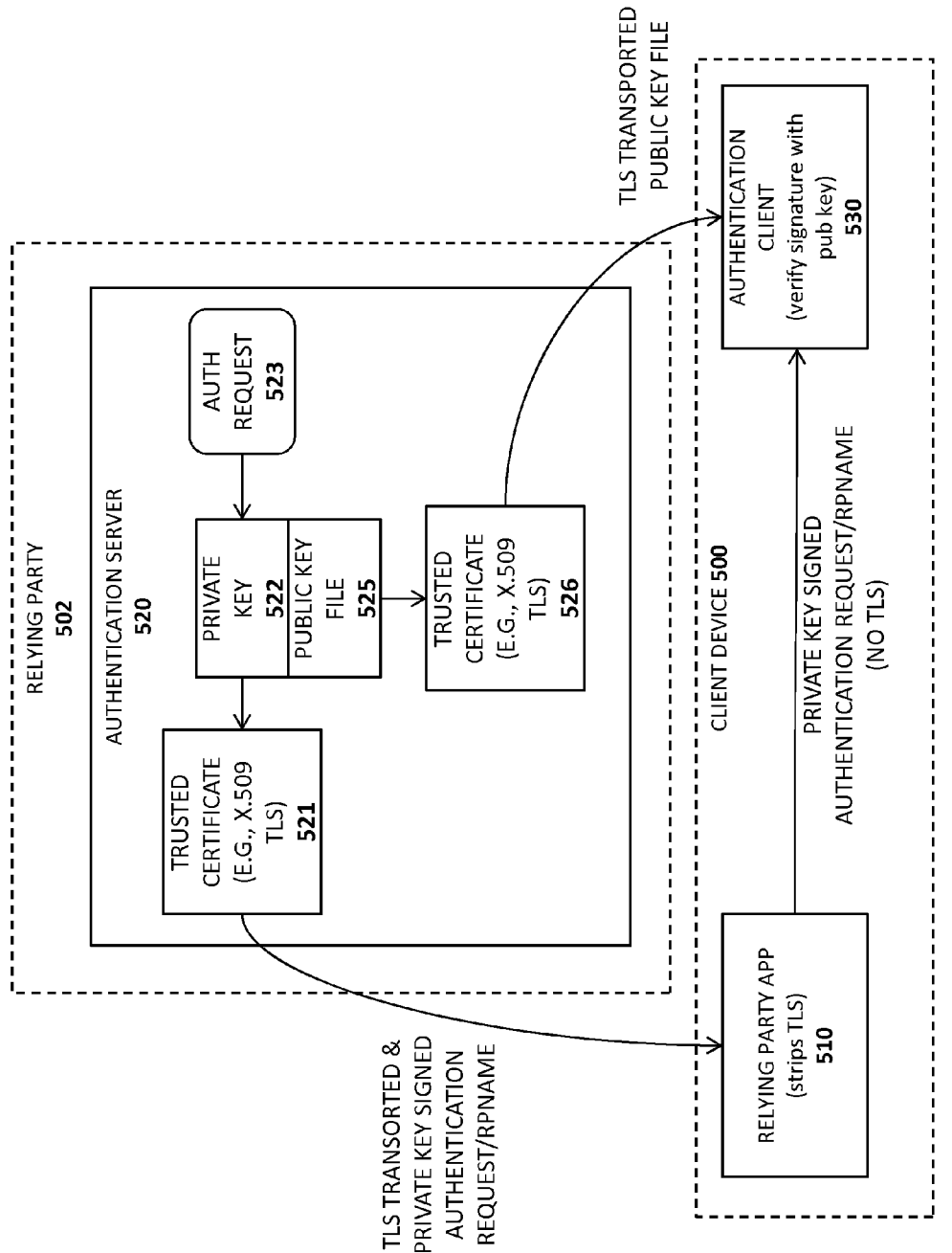
FIG. 5 illustrates one embodiment of a system for authenticating by establishing trust using a secure communication protocol.

To avoid those problems, one embodiment of the invention illustrated in FIG. 5 uses self-signed certificates from a decentralized public key infrastructure (PKI) to sign authentication requests from the relying party's 502's authentication servers 520 and corresponding origin identifier (e.g., the "RPNAME" identifier). In particular, in one embodiment, the self-signed certificate is comprised of a private key 522 and one or more public keys stored in a public key file 525 on the authentication server 520. Unlike X.509 certificates, these self-signed certificates cannot be trusted by themselves because there is no chain connecting them to a root trusted certificate.

In one embodiment, to establish trust, the public keys stored in the public key file 525 on the web server are transmitted to the authentication client 530 on the client device 500 (e.g., a mobile smartphone) over a secure communication channel established using a trusted certificate 526 (e.g., such as existing X.509 trusted certificates used to open TLS connections). Using TLS ensures that the vulnerable, self-signed public keys in the public key file 525 are obtained from the correct owner because the trusted certificate/key 526 used to transport them from the web server over the Internet can be verified against the root certificate store (if X.509 or other known standard is used). Those self-signed public keys in the file 526 can then be implicitly trusted and used to verify authentication requests 523 including origin identifiers (e.g., RPNAME).

An authentication request 523 may be generated by the authentication server 520 in the same manner and under the same circumstances described above with respect to FIG. 3. For example, the authentication server 520 may generate a random challenge and identify the client-side authenticator to be used (e.g., with the public key registered for the authenticator). The random challenge and authenticator ID information may be packaged in the authentication request 523.

An addition, in one embodiment, the authentication request 523 is signed using the private key 522 of the decentralized PKI. As mentioned, in one embodiment, the private key 522 corresponds to the public keys in the file 525. For example, any signature generated by the private key 522 can be validated using one of the public keys.

Once again, to establish trust, the authentication request 523 signed using the private key 522 on authentication server 520 is transmitted to the relying party app 510 on the client device 500 over a secure communication channel established using a trusted certificate 521 (e.g., such as existing X.509 trusted certificates used to open TLS connections). In one embodiment, the trusted certificate 521 is the same as the trusted certificate 526 used to establish a TLS channel with the authentication client 530. The private-key signed authentication request 523 is then transported to the relying party app 510 using the TLS channel, along with the origin identifier (e.g., RPNAME to identify the relying party).

In one embodiment, the relying party app 510 extracts the underlying private-key signed authentication request (i.e., strips the TLS data), and provides it to the authentication client 530 on the client device 500. The relying party app 510 may communicate with the authentication client 530 using known inter-process communication (IPC) mechanisms. However, the underlying principles of the invention are not limited to any particular communication mechanism for exchanging information on the client device 500.

Upon receiving the private-key signed authentication request 523, the authentication client 530 validates the signature using a public key from the public key file. If the signature is valid, it then generates an authentication response as described above. For example, in response to a successful authentication by the user, it may use the private key of the authenticator to generate a signature over the random challenge included in the authentication request 523 and transmit the resulting authentication response to the authentication server 520 (e.g., either directly or via the relying party app 510). Once the authentication server 520 verifies the signature using the corresponding public authenticator key, the user is authenticated to the relying party 502 and is permitted to complete the desired transaction.

Using the techniques described herein, authentication requests 523 and origin identifiers (e.g., RPNAME) are cryptographically verified by the centralized SSL X.509 key while still retaining the flexibility and minimum of management overhead that a decentralized PKI offers. Implicitly trusting the validity of self signed certificates by using the fact that the file containing those certificates is located on a certain web server has some risks. Anyone who has the ability to modify this file on the web server is able to change the public keys. However, as long as access to the file is guarded as carefully as the ability to manage an X.509 certificate, the trust conferred by either solution should be comparable.

Figure 6:
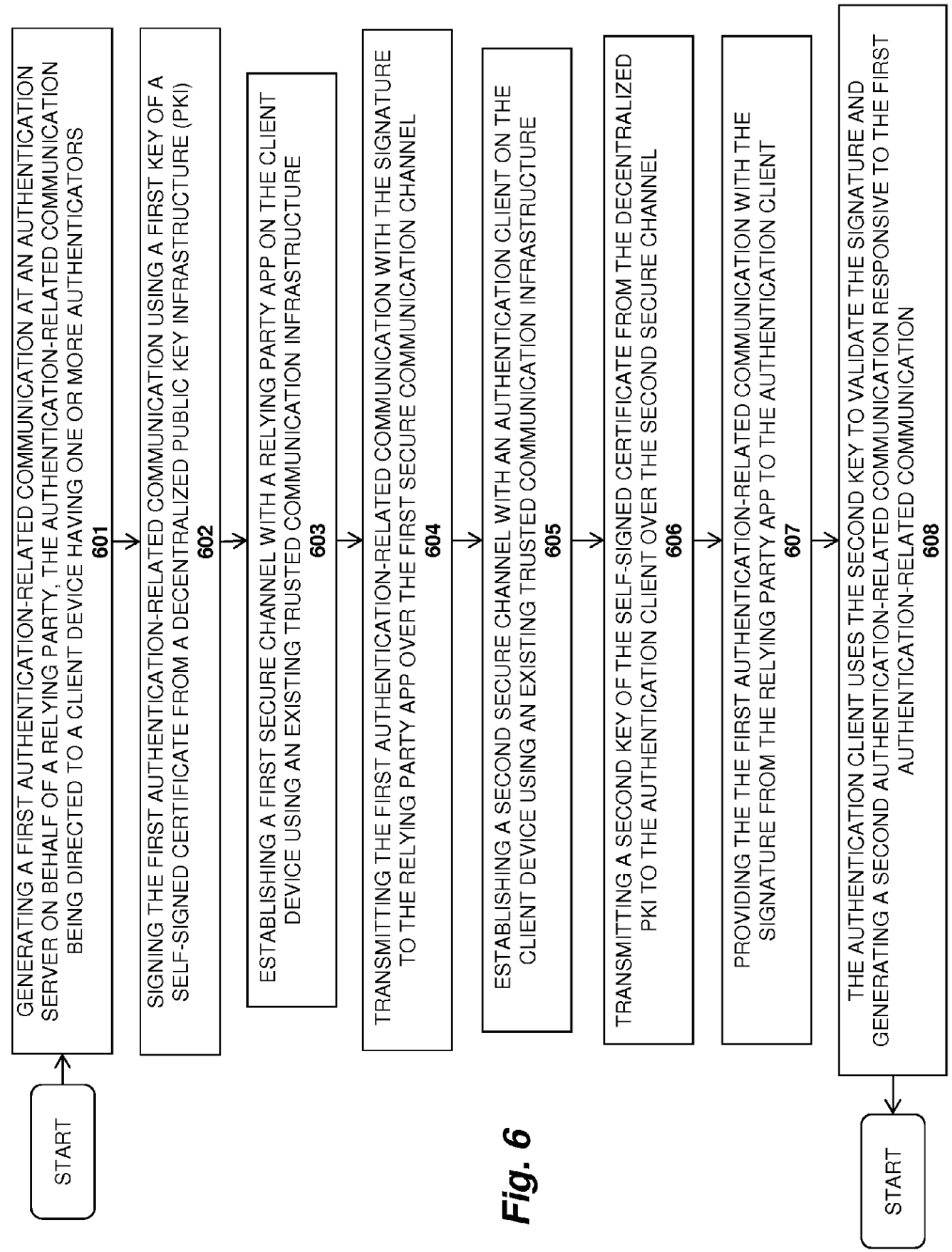
FIG. 6 illustrates one embodiment of a method for authenticating by establishing trust using a secure communication protocol.

A method in accordance with one embodiment of the invention is illustrated in FIG. 6. The method may be implemented using the architecture shown in FIG. 5, but is not limited to any particular architecture.

At 601, a first authentication-related communication is generated at the authentication server on behalf of the relying party. In one embodiment, the first authentication-related communication comprises the authentication request 523 mentioned above (e.g., containing a random challenge, authenticator ID, etc).

At 602, the first authentication-related communication is signed using a first key of a self-signed certificate from a decentralized public key infrastructure (PKI). In one embodiment, the first key comprises the private key 522 discussed above.

At 603, a first secure channel is established with a relying party app on the client device using an existing trusted communication infrastructure. In one embodiment, using an existing trusted communication infrastructure comprises using a trusted X.509 certificate to establish a secure transport layer security (TLS) channel with the relying party.

At 604, the first authentication-related communication is transmitted to the relying party app over the first secure communication channel. As mentioned, in one embodiment an origin identifier (e.g., RPNAME) is provided with the communication.

At 605, a second secure communication channel is established with an authentication client on the client device using an existing trusted communication infrastructure. As mentioned, in one embodiment, using an existing trusted communication infrastructure comprises using a trusted X.509 certificate to establish a secure TLS channel with the relying party.

At 606, a second key of the self-signed certificate from the decentralized PKI is transmitted over the second secure communication channel to the authentication client. In one embodiment, the second key comprises a public key associated with the self-signed certificate from the decentralized PKI. One or more additional keys may also be provided via a public key file 526 (as discussed above).

At 607, the first authentication-related communication with the signature is provided from the relying party app to the authentication client. In one embodiment, this is performed in compliance with an existing inter-process communication (IPC) mechanism on the client device.

At 608, the authentication client uses the second key to validate the signature generated with the first key. If validation is successful, then the authentication client generates a second authentication-related communication in response to the first authentication-related communication. For example, as discussed above, if the first authentication-related communication comprises an authentication request, then the second authentication-related communication may comprise an authentication response. To generate the response, the authentication client may first require the user to perform authentication on the client device (e.g., swiping a finger, recording a voice, entering a code, etc). If authentication is successful, then the authentication client may transmit an indication of the successful authentication along with other verifiable information such as the random challenge provided with the authentication request. Once the authentication server receives the second authentication-related communication, the user may be authenticated with the relying party and permitted to enter into transactions with the relying party.

Exemplary Data Processing Devices

FIG. 11 is a block diagram illustrating an exemplary clients and servers which may be used in some embodiments of the invention. It should be understood that while FIG. 11 illustrates various components of a computer system, it is not intended to represent any particular architecture or manner of interconnecting the components as such details are not germane to the present invention. It will be appreciated that other computer systems that have fewer components or more components may also be used with the present invention.

Figure 7:
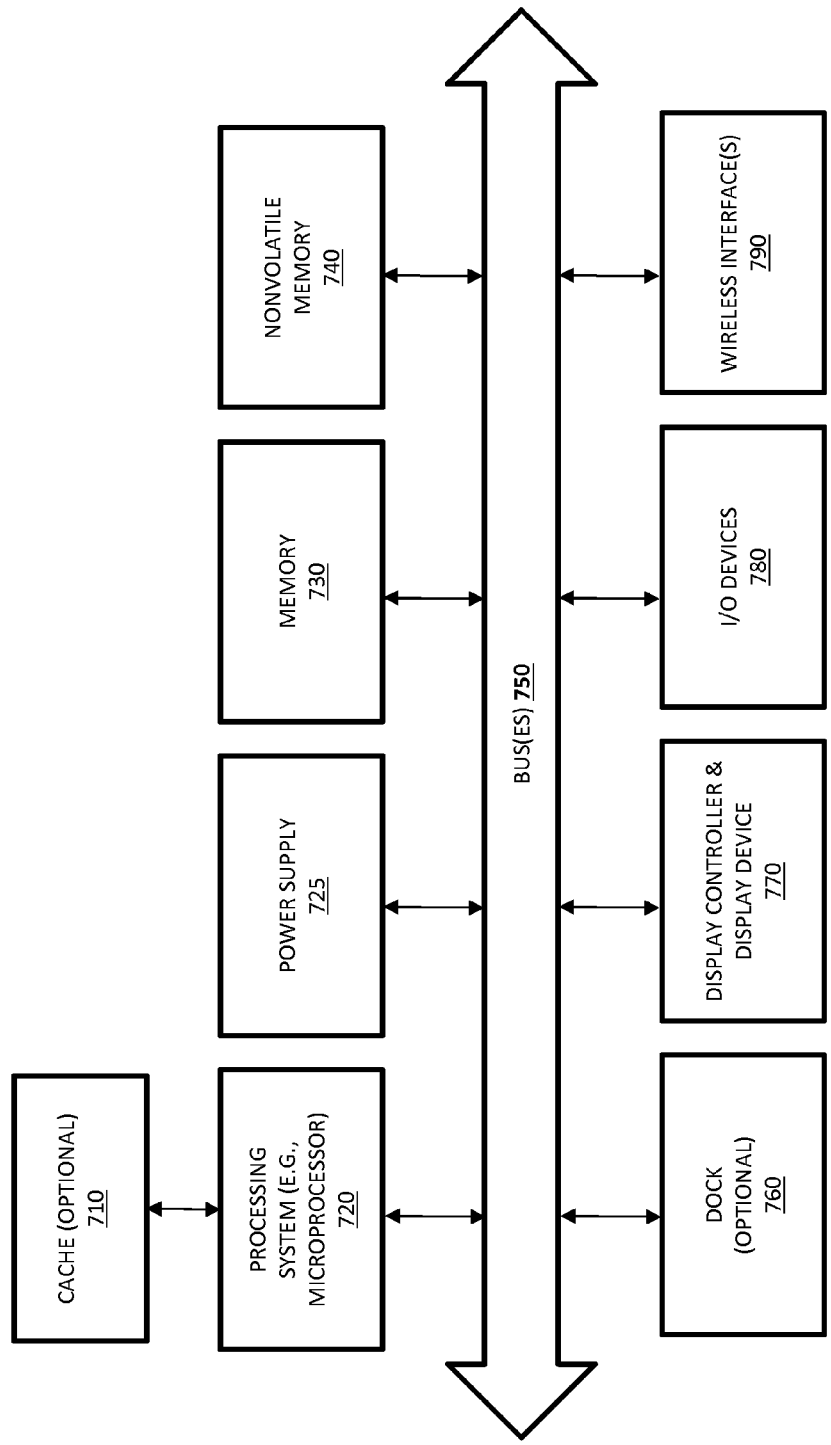
FIG. 7 illustrates an exemplary data processing architecture for implementing the clients and/or servers described herein.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the optional dock 760, the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, etc.).

Figure 8:
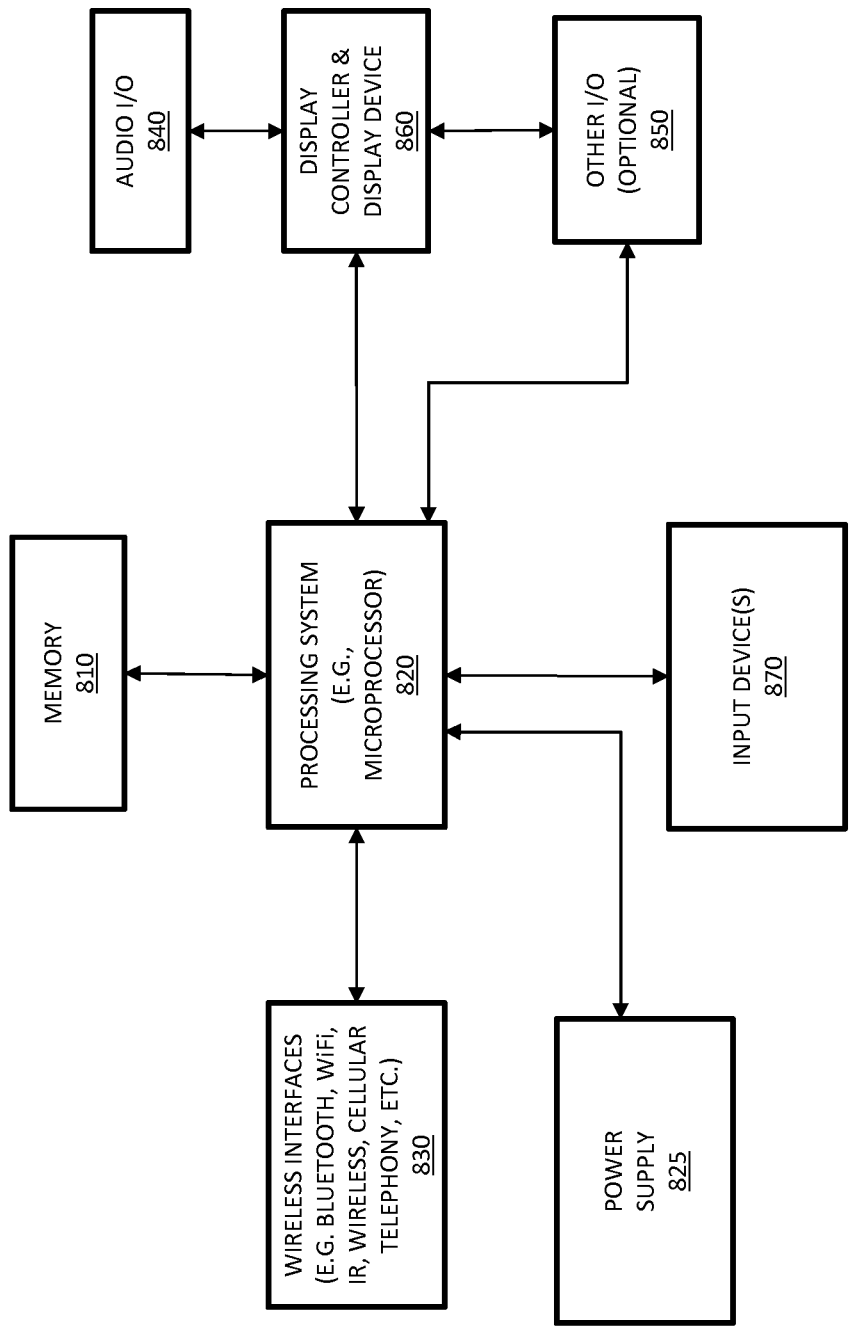
FIG. 8 illustrates another exemplary data processing architecture for implementing the clients and/or servers described herein.

FIG. 8 is a block diagram illustrating an exemplary data processing system which may be used in some embodiments of the invention. For example, the data processing system 800 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 800 may be a network computer or an embedded processing device within another device.

According to one embodiment of the invention, the exemplary architecture of the data processing system 800 may used for the mobile devices described above. The data processing system 800 includes the processing system 820, which may include one or more microprocessors and/or a system on an integrated circuit. The processing system 820 is coupled with a memory 810, a power supply 825 (which includes one or more batteries) an audio input/output 840, a display controller and display device 860, optional input/output 850, input device(s) 870, and wireless transceiver(s) 830. It will be appreciated that additional components, not shown in FIG. 8, may also be a part of the data processing system 800 in certain embodiments of the invention, and in certain embodiments of the invention fewer components than shown in FIG. 8 may be used. In addition, it will be appreciated that one or more buses, not shown in FIG. 8, may be used to interconnect the various components as is well known in the art.

The memory 810 may store data and/or programs for execution by the data processing system 800. The audio input/output 840 may include a microphone and/or a speaker to, for example, play music and/or provide telephony functionality through the speaker and microphone. The display controller and display device 860 may include a graphical user interface (GUI). The wireless (e.g., RF) transceivers 830 (e.g., a WiFi transceiver, an infrared transceiver, a Bluetooth transceiver, a wireless cellular telephony transceiver, etc.) may be used to communicate with other data processing systems. The one or more input devices 870 allow a user to provide input to the system. These input devices may be a keypad, keyboard, touch panel, multi touch panel, etc. The optional other input/output 850 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A method comprising:
    generating a first authentication-related communication at an authentication server on behalf of a relying party the first authentication-related communication being directed to a client device having one or more authenticators;
    signing the first authentication-related communication using a first key of a self-signed certificate from a decentralized public key infrastructure (PKI);
    establishing a first secure communication channel with a relying party app on the client device using a trusted secure communication infrastructure;
    transmitting the first authentication-related communication with the signature to the relying party app over the first secure communication channel;
    establishing a second secure communication channel with an authentication client on the client device using a trusted secure communication infrastructure;
    transmitting a second key of the self-signed certificate from the decentralized PKI to the authentication client over the second communication channel;
    providing the first authentication-related communication from the relying party app to the authentication client; and
    the authentication client using the second key to validate the signature generated over the first authentication-related communication with the first key.

2. The method as in claim 1 wherein the first key comprises a private key of the decentralized PKI and the second key comprises a corresponding public key.

3. The method as in claim 1 wherein the trusted secure communication infrastructure includes a trusted certificate usable to establish a secure transport layer security (TLS) connection for the first and/or second secure communication channels.

4. The method as in claim 3 wherein the trusted certificate comprises an X.509 certificate.

5. The method as in claim 1 further comprising:
    the authentication client generating a second authentication-related communication responsive to the first authentication-related communication.

6. The method as in claim 5 wherein the first authentication-related communication comprises an authentication request generated at an authentication server operated on behalf of the relying party, and the second authentication-related communication comprises an authentication response generated by the authentication client.

7. The method as in claim 6 wherein the authentication request comprises a random challenge and a signature generated over the random challenge using a public key associated with an authenticator on the client device.

8. The method as in claim 7 wherein the authentication client uses a private key associated with the authenticator to validate the signature.

9. The method as in claim 8 wherein the authentication client generates the authentication response in response to a successful user authentication using one or more of the authenticators on the client device.

10. The method as in claim 9 wherein the authenticators on the client device include a fingerprint authenticator.

11. The method as in claim 1 wherein providing the first authentication-related communication from the relying party app to the authentication client further comprises implementing inter-process communication (IPC) between the relying party app and the authentication client.

12. The method as in claim 1 wherein the second key of the self-signed certificate is transmitted over the second communication channel in a public key file.

13. A system for performing authentication comprising:
    a client device having one or more authenticators, an authentication client and a relying party app;
    an authentication server operated on behalf of a relying party generating a first authentication-related communication directed to the client device;
    the authentication server signing the first authentication-related communication using a first key of a self-signed certificate from a decentralized public key infrastructure (PKI);
    the authentication server establishing a first secure communication channel with a relying party app on the client device using a trusted secure communication infrastructure;
    the authentication server transmitting the first authentication-related communication with the signature to the relying party app over the first secure communication channel;
    the authentication server establishing a second secure communication channel with an authentication client on the client device using a trusted secure communication infrastructure;
    the authentication server transmitting a second key of the self-signed certificate from the decentralized PKI to the authentication client over the second communication channel;
    the relying party app providing the first authentication-related communication to the authentication client; and
    the authentication client using the second key to validate the signature generated over the first authentication-related communication with the first key.

14. The system as in claim 13 wherein the first key comprises a private key of the decentralized PKI and the second key comprises a corresponding public key.

15. The system as in claim 13 wherein the trusted secure communication infrastructure includes a trusted certificate usable to establish a secure transport layer security (TLS) connection for the first and/or second secure communication channels.

16. The system as in claim 15 wherein the trusted certificate comprises an X.509 certificate.

17. The system as in claim 13 further comprising:
    the authentication client generating a second authentication-related communication responsive to the first authentication-related communication.

18. The system as in claim 17 wherein the first authentication-related communication comprises an authentication request generated at an authentication server operated on behalf of the relying party, and the second authentication-related communication comprises an authentication response generated by the authentication client.

19. The system as in claim 18 wherein the authentication request comprises a random challenge and a signature generated over the random challenge using a public key associated with an authenticator on the client device.

20. The system as in claim 19 wherein the authentication client uses a private key associated with the authenticator to validate the signature.

21. The system as in claim 20 wherein the authentication client generates the authentication response in response to a successful user authentication using one or more of the authenticators on the client device.

22. The system as in claim 21 wherein the authenticators on the client device include a fingerprint authenticator.

23. The system as in claim 13 wherein providing the first authentication-related communication from the relying party app to the authentication client further comprises implementing inter-process communication (IPC) between the relying party app and the authentication client.

24. The system as in claim 13 wherein the second key of the self-signed certificate is transmitted over the second communication channel in a public key file.

* * * * *